United States Patent [19]

Rozman

[11] Patent Number: 5,541,828
[45] Date of Patent: Jul. 30, 1996

[54] MULTIPLE OUTPUT CONVERTER WITH CONTINUOUS POWER TRANSFER TO AN OUTPUT AND WITH MULTIPLE OUTPUT REGULATION

[75] Inventor: Allen F. Rozman, Richardson, Tex.

[73] Assignee: AT&T Corp., Murray Hill, N.J.

[21] Appl. No.: 344,754

[22] Filed: Nov. 23, 1994

Related U.S. Application Data

[63] Continuation-in-part of Ser. No. 991,067, Dec. 15, 1992, abandoned.

[51] Int. Cl.⁶ .......................... H02M 3/335; G05F 1/577
[52] U.S. Cl. .............................. 363/21; 363/97; 363/131; 323/267
[58] Field of Search .................................. 363/20, 21, 22, 363/127, 131, 84, 95, 97, 67; 323/267

[56] References Cited

U.S. PATENT DOCUMENTS

| | | | |
|---|---|---|---|
| 4,510,564 | 4/1985 | Seer, Jr. ...................................... | 363/23 |
| 4,660,136 | 4/1987 | Montorefano .............................. | 363/26 |
| 4,999,759 | 3/1991 | Cavagnolo et al. ....................... | 363/21 |
| 5,126,931 | 6/1992 | Jitaru ......................................... | 363/21 |
| 5,400,239 | 3/1995 | Caine ......................................... | 363/67 |

*Primary Examiner*—Peter S. Wong
*Assistant Examiner*—Adolf Berhane
*Attorney, Agent, or Firm*—Alfred G. Steinmetz

[57] ABSTRACT

A DC-DC converter, having multiple outputs, efficiently utilizes its power transformer to provide continuous power output to the outputs except during transitions of the power switches. Energy flow is continuous to one or more outputs during conduction of the power switch and then is transferred to the remaining outputs during its non-conduction. A feedback control, connected to sense only one of the outputs operate the power switch at a controlled duty cycle. Regulation of both outputs is enabled by equalizing transformer volt seconds of the non-conduction and conduction intervals of the power switch and by a clamping circuit which sustains the volt seconds in the power transformer during the non-conduction interval. In a particular embodiment, a converter circuit comprises a transformer having a primary winding and a secondary winding. An input is coupled to the primary winding, first and second switch devices are each coupled to the primary winding of the transformer, and a clamp capacitor is coupled to the transformer by at least one of the first and second switches. Portions of the secondary winding are coupled through separate rectifier devices and through separate output filter inductors to separate inputs. A single feedback circuit is coupled to one of the outputs and supplies drive signals to the first and second switches so as to cause the first and second switches to conduct current alternately.

9 Claims, 2 Drawing Sheets

MULTIPLE OUTPUT CONVERTER WITH CONTINUOUS POWER TRANSFER TO AN OUTPUT AND WITH MULTIPLE OUTPUT REGULATION

FIELD OF THE INVENTION

This is a continuation in part of Ser. No. 07/991,067, filed on Dec. 15, 1992, now abandoned whose disclosure is incorporated herein by reference. This invention relates to a multiple input high efficiency DC-DC power converter and to its voltage control. It is also concerned with a zero voltage switching topology operating over a wide output voltage range.

BACKGROUND OF THE INVENTION

The copending application of Jacobs et al., Ser. No. 07/981,638 filed Nov. 25, 1992, hereby incorporated herein by reference, describes a DC-DC converter which uses a pair of FET switches, interconnected by a clamp capacitor, to drive a transformer. A pulse width modulator (PWM), which is included in a feedback loop, causes the FET switches to conduct alternately and to switch only when there is a low or possibly zero voltage across the FET switches. The zero-voltage switching results in high efficiency energy conversion, and the use of the external capacitance permits the circuit designer to reduce the rate at which drain-to-source voltages of either FET changes, thereby to reduce the level of conducted or radiated, high-frequency electromagnetic wave interference (EMI) which may be undesirably generated by the circuit. The application also discusses how output voltage ripple can be reduced.

Converters using a clamp capacitor to optimize energy transfer in this manner are generally known as "clamped mode" circuits. The copending application of Boylan et al., Ser. No. 07/992,274, filed Dec. 16, 1992 contains an analysis of the feedback loop of clamped mode circuits and describes how the voltage from the clamp capacitor can be fed to the feedback circuit to avoid circuit instabilities and to permit greater circuit design flexibility.

DC-DC converters are normally used as constant DC voltage power supplies. The desirability of having a DC-DC converter that could provide a number of different voltage outputs to a number of different independent loads has been recognized. There is a continuing need for such a circuit which has the advantages of clamped mode circuits, is of relatively simple construction and therefore relatively inexpensive, and which provides stable voltage levels to a number of independent loads that can be electrically isolated if desired. With electrical isolation, noise, impedance changes, and the like from one load would not affect the power transmitted to another load.

Multiple output DC-DC converters providing a regulated voltage have typically required separate outputs provided by separate transformer windings as well as independent direct voltage regulation controls for each output where precise regulation is required. In a typical forward or flyback converter with multiple outputs, the non conduction intervals of the power switch may result in a non continuous transfer of energy to the output which results in an inefficient transfer of energy to the output.

SUMMARY OF THE INVENTION

A DC-DC converter, having multiple outputs, efficiently utilizes its power transformer to provide continuous power output to the outputs except during transitions of the power switches. Energy flow is continuous to one or more outputs during conduction of the power switch and then is transferred to the remaining outputs during its non-conduction. A feedback control, connected to sense only one of the outputs provides power switch drive at a controlled duty cycle. Regulation of both outputs in one embodiment is enabled by equalizing transformer volt seconds of the alternate non-conduction and conduction intervals of the power switch and a clamping circuit which sustains the volt seconds in the power transformer during the entire non-conduction interval.

In a particular embodiment, a converter circuit comprises a transformer having a primary winding and a secondary winding. An input is coupled to the primary winding, first and second switch devices are each coupled to the primary winding of the transformer, and a clamp capacitor is coupled to the transformer by at least one of the first and second switches. Portions of the secondary winding are coupled to an output through separate rectifier devices which are coupled through separate output filter inductors to separate outputs. A single feedback circuit is coupled to just one of the outputs and supplies drive signals to the first and second switches so as to cause the first and second switches to conduct current alternately with a duty cycle to regulate both outputs.

In other embodiments, the winding structure of the power transformer is altered, however, in each instance multiple outputs are regulated and by sensing only one of the outputs and by constraining the volt second products of the power transformer to be substantially equal during non-conduction and conduction intervals of the power switch.

DETAILED DESCRIPTION

Figure 1:
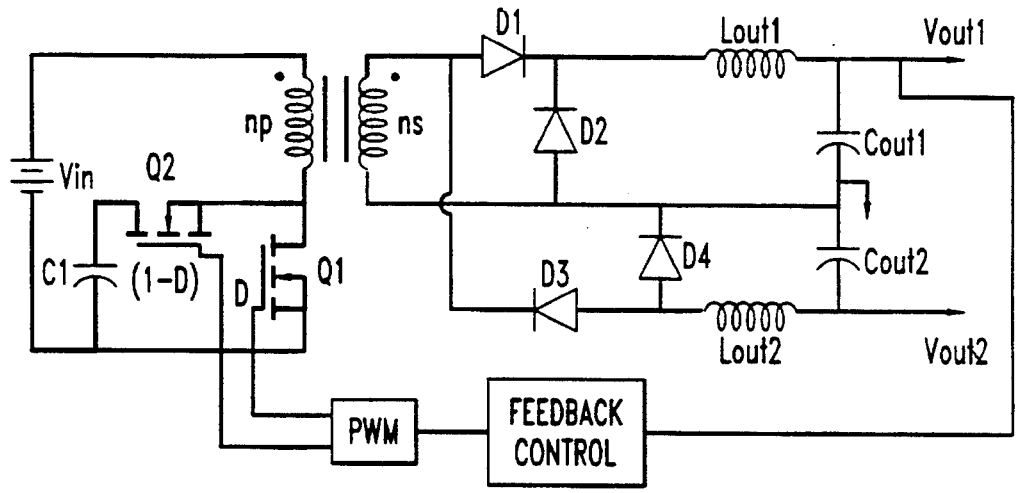
FIG. 1 is a schematic of a DC-DC converter circuit having a single secondary winding providing two regulated outputs.

A DC-DC converter, shown in FIG. 1, is embodied in a forward type converter topology. A FET power switch Q1 is periodically biased conducting enabling current flow, in response to the DC input voltage Vin through the primary winding of the power transformer for the duration D as a part of the periodic cycle. A clamping circuit comprising a series connected FET switch Q2 and a capacitor C1 is connected in parallel with power switch Q1. The switch Q2 is enabled conducting during the (1-D) portion of the periodic cycle. The voltage stored on capacitor C1 is charged to a level VC1 and clamps the voltage of the transformer primary winding np to a substantially constant average level Vin/(1-D) during the non-conduction of the power switch Q1.

Power output from one end terminal of the secondary winding ns is connected to outputs, via two output channels, the two channels including diodes D1 and D3 and inductors Lout1 and Lout2, to the output terminals Vout1 and Vout2, respectively. Flyback diodes D2 and D4 connect the inductor Lout1 and Lout2 to the second end terminal of the secondary winding ns which is grounded and connected to a return lead from the outputs. Two capacitors Cout1 and Cout2 connect the outputs Vout1 and Vout2 to the ground of the return line to stabilize the output voltage.

The two outputs Vout1 and Vout2 in the converter of FIG. 1 are equal in magnitude and opposite in polarity. The volt second product in the transformer is controlled to be substantially equal in each cycle switching period, during the non-conduction and conduction intervals of the power switch. The clamping series circuit on switch Q2 and capacitor C1 allows the two outputs to be regulated in response to only one output voltage sense lead (SL). A constant square wave voltage is provided in response to the clamp circuit to the secondary winding ns.

Drive control for the switches Q1 and Q2 is provided by a feedback control circuitry including a feedback control (FBK) and a pulse width modulator (PWM) providing the drive to the two switches. The feedback control FKB senses the output voltage at terminal Vout1 and compares it to a reference to generate an error voltage which is connected to the pulse width modulator PWM to control the drive signal applied to the power switches Q1 and Q2. The PWM operates to control equality of the volt second product of the power transformer during conduction and non-conduction of the power switch in each cyclic interval of the converter. As is apparent from the schematic of FIG. 1, the capacitor C1 is charged to a value $Vin/(1-D)$ during the $(1-D)$ portion of the switching cycle and energy in the magnetizing inductance of the transformer is transferred, via inductor Lout2, to the output Vout2. During the D portion of the switching cycle energy from the input Vin is coupled from the secondary winding ns via the inductor Lout1 to the output Vout1. The two outputs are regulated by the single feedback loop because the volt second products supplied to the primary winding np of the transformer are controlled to be substantially equal, but with opposite polarity, in each alternate switch conduction interval in the periodic switching cycle. Hence, each output Vout1 and Vout2 is regulated to an opposing polarity voltage but identical voltage magnitudes. The topology of the circuit is selected so that the converter operates as a forward converter in the D portion of the switching cycle and a buck derived converter during the 1-D portion of the cycle.

Figure 2:
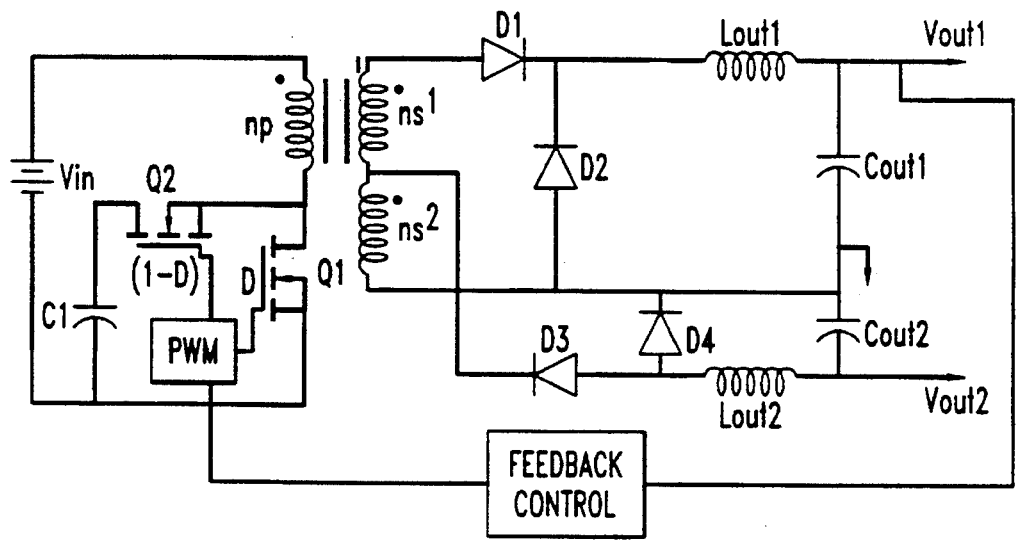
FIG. 2 is a schematic of a dual output DC-DC converter having a tapped secondary winding providing dual regulated outputs.

In the converter of FIG. 2 the secondary winding of the power transformer is tapped forming two winding segments ns1 and ns2 connected in series connection. The output rectifying device D3 is connected to this node joining the windings ns1 and ns2. This particular construction of the converter of FIG. 2 allows construction arrangements permitting different voltage levels at the two outputs. The relative voltage levels of the two output voltage magnitudes is determined by the relative turn ratio of windings ns1 and ns2. The relation is governed according to the expression $(Vout1/Vout2)=[(ns1+ns2)/ns2]$. The return lead is connected as in the converter in FIG. 1.

Figure 3:
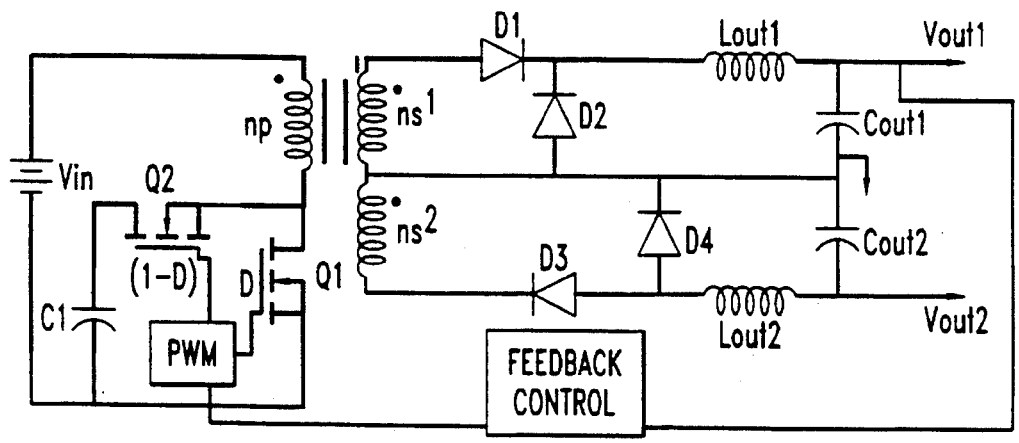
FIG. 3 is a schematic of another dual output DC-DC converter having a tapped secondary winding providing dual regulated outputs.

In the converter shown in FIG. 3 the secondary winding is constructed with two series connected winding segments ns1 and ns2. In this arrangement, the return lead ground from the output is connected to the common node of the two winding segments. With the illustrated winding polarity orientation the output voltages have the same polarity orientation but may be of differing magnitudes determined by the relative turn ratio between windings ns1 and ns2. The controlling expression is $(Vout1/Vout2)=(ns1/ns2)$.

Figure 4:
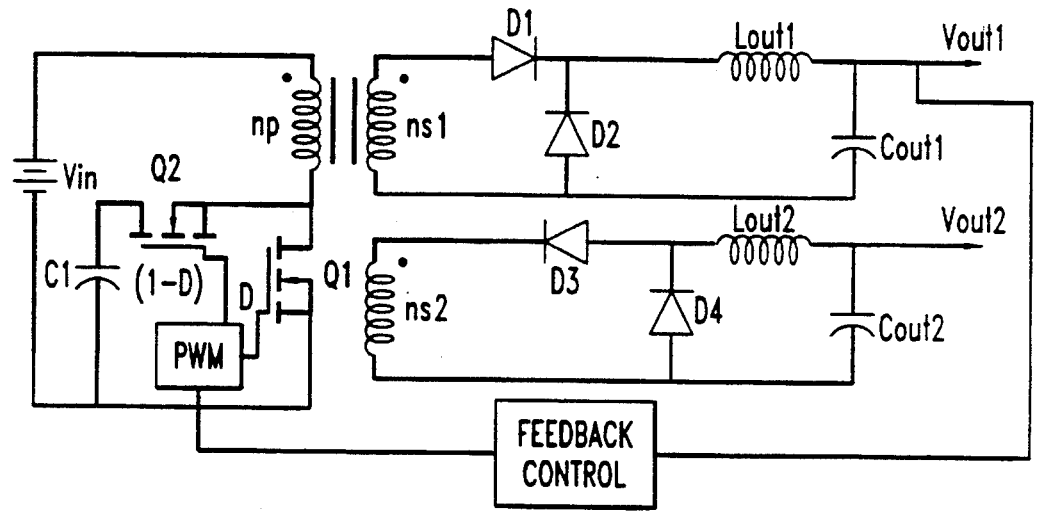
FIG. 4 is a schematic of another dual output DC-DC converter having two output windings of opposing polarity.

In the converter shown in FIG. 4, the secondary windings ns1 and ns2 of the transformer are split and isolated from one another This provides an isolated double output converter in which the output voltages are governed as are the output voltage in the converter of FIG. 3.

Figure 5:
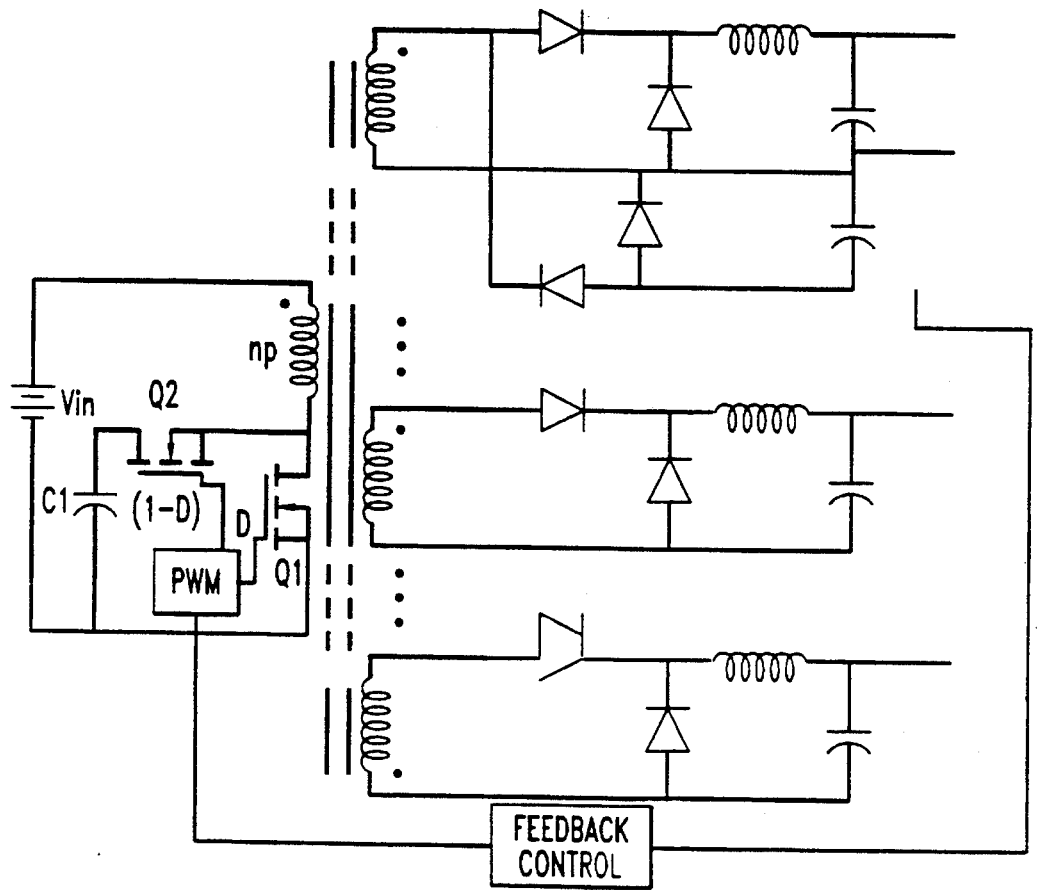
FIG. 5 is a schematic of a DC-DC converter providing N multiple outputs.
Figure 1:
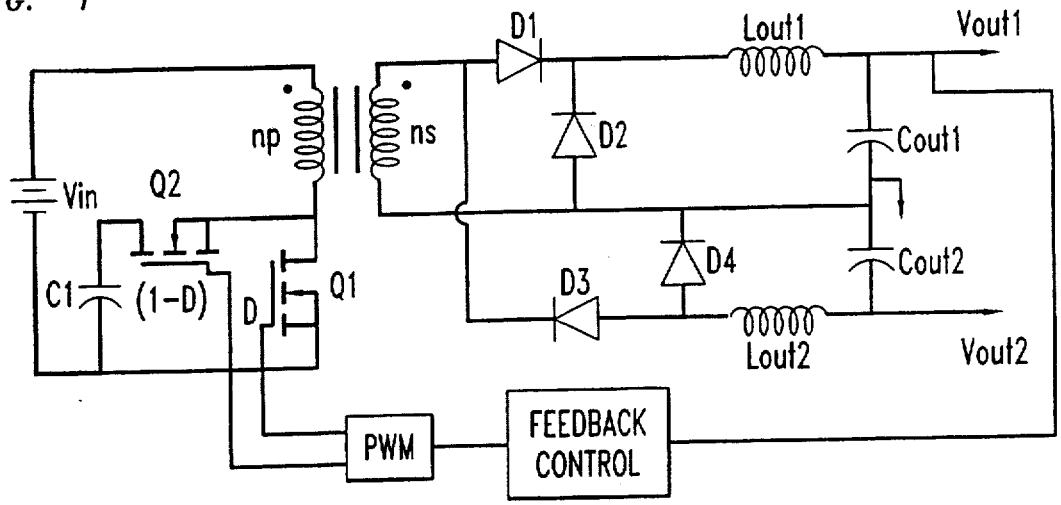
Figure 2:
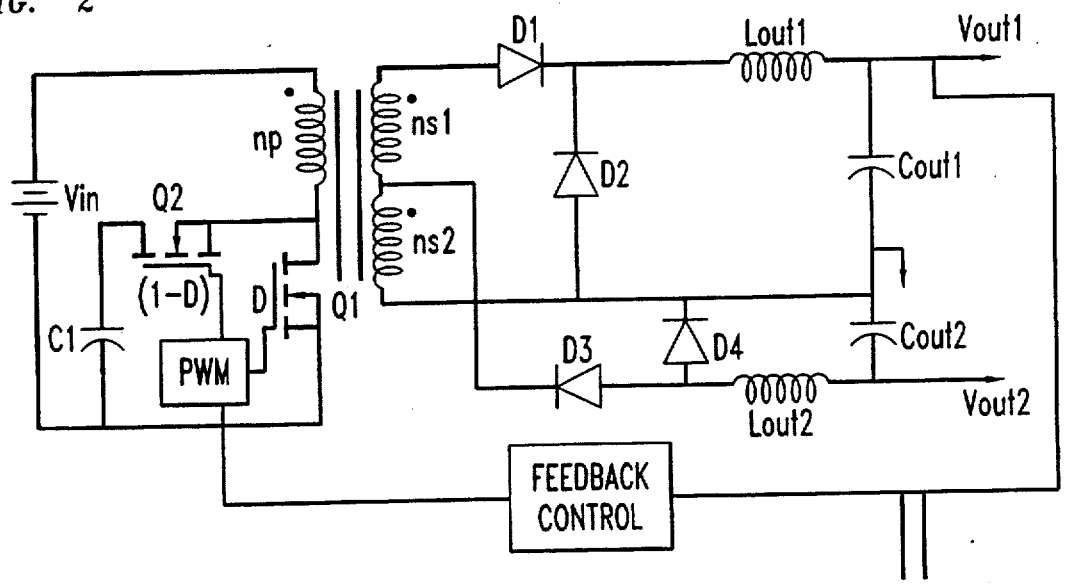
Figure 3:
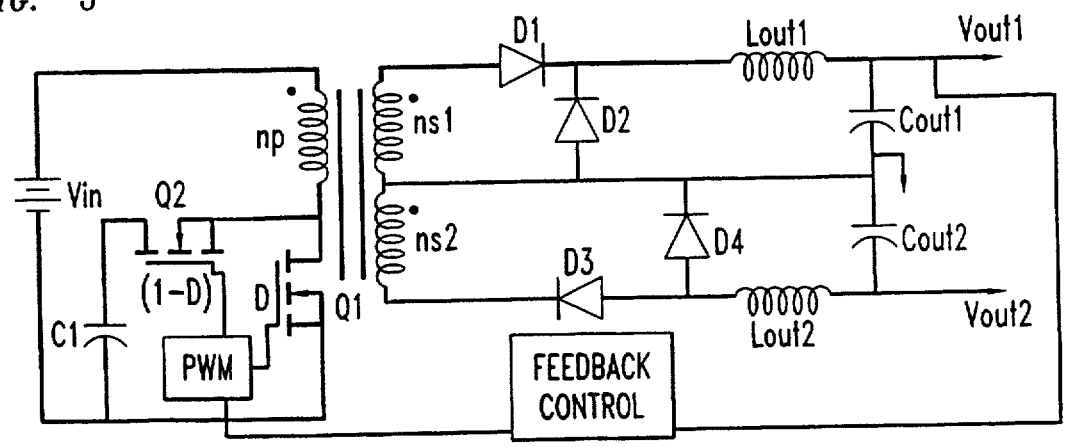
Figure 4:
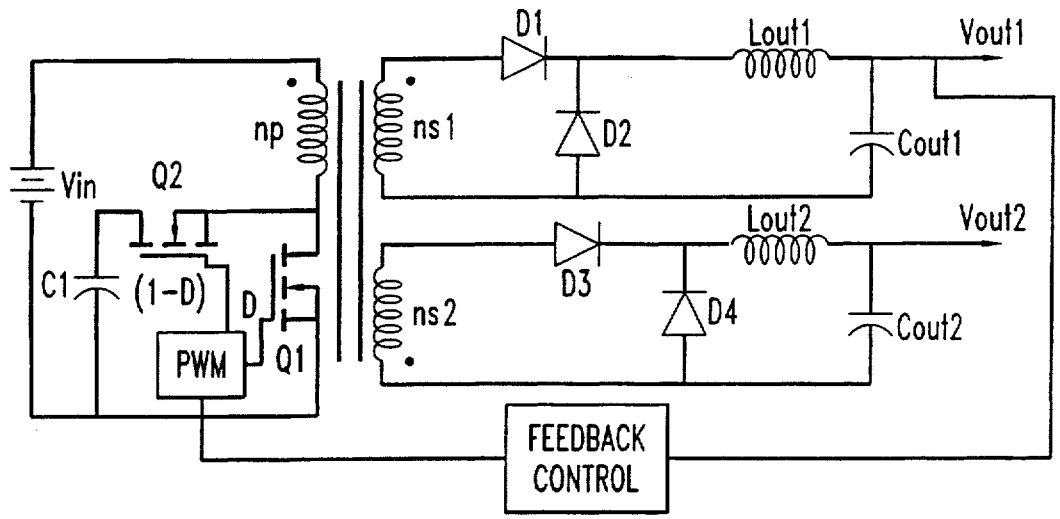
Figure 5:
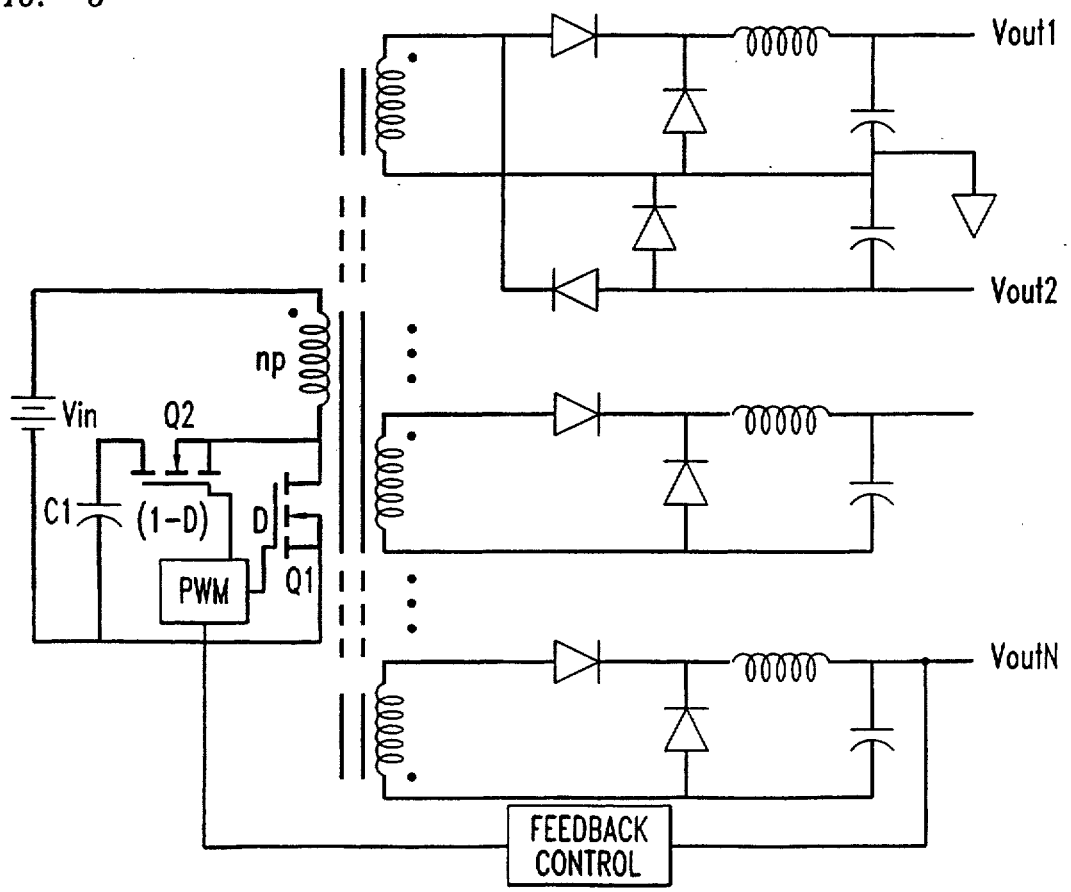

The converter of FIG. 5 shows a converter with N multiple outputs, showing various secondary circuit arrangements. A plurality of outputs in excess of two is illustrated, the outputs shown being versions of outputs shown in FIG. 1 and FIG. 3. As in the other embodiments, the voltage of all outputs is regulated by sensing one output and controlling equality of volt second product during alternate conduction and non-conduction of the power switch.

I claim:

1. A DC-DC converter, comprising:

a transformer having a primary winding and a secondary winding with first and second end terminals;

a primary circuit connected for coupling an input DC voltage to the primary winding, including a first switch connected in series with the primary winding and the input DC voltage; and a clamping circuit including a storage capacitor and a second switch enabled to connect the capacitor to the primary winding when the first switch is non conducting;

a secondary circuit connected for connecting energy from the first end terminal of the secondary winding to a first and second output; including:

a first output channel connected to the first end terminal and including in a first series connection a first rectifying diode and a first inductor and the first series connection connecting the first end terminal to the first output;

a second output channel connected to the first end terminal and including in a second series connection a second rectifying diode and a second inductor and the second series connection connecting the first end terminal to the second output;

a first and second capacitor connecting the first and second outputs to a return lead which is connected to the second end terminal of the secondary winding; and a feedback circuit including means to sense one of the first and second outputs and including means to generate an error voltage representative of a deviation of the sensed output from a desired regulated value and a pulse width modulator responsive to the error voltage and connected to drive the first and second switches such that the primary winding experiences equal volt seconds during conduction and non-conduction intervals of the first switch in order to regulate both the first and second output, with energy transfer to the first output channel during conduction of the first switch and with energy transfer to the second output channel during conduction of the second switch.

2. A DC-DC converter, comprising:

A transformer having a primary winding and a secondary winding having a tap intermediate its first and second end terminals;

a primary circuit connected for coupling an input DC voltage to the primary winding, including a first switch connected in series with the primary winding and the input DC voltage; and a clamping circuit including a storage capacitor and a second switch enabled to connect the capacitor to the primary winding when the first switch is non conducting;

a secondary circuit connected for connecting energy from the first end terminal of the secondary winding and the tap intermediate its first and second end terminals to a first and second output; including:

a first output channel connected to the first end terminal and including in a first series connection a first rectifying diode and a first inductor and the first series connection connecting the first end terminal to the first output;

a second output channel connected to the tap intermediate the first and second end terminals and including in a second series connection a second rectifying diode and a second inductor and the second series connection connecting the tap to the second output;

a first and second capacitor connecting the first and second outputs to a return lead which is connected to the second end terminal of the secondary winding; and a feedback circuit including means to sense one of the first and second outputs and including means to generate an error voltage representative of a deviation of the sensed output from a desired regulated value and a pulse width modulator responsive to the error voltage and connected to drive the first and second switches such that the primary winding experiences equal volt second during conduction and non-conduction intervals of the switch in order to regulate both the first and second output, with energy transfer to the first output channel during conduction of the first switch and with energy transfer to the second output channel during conduction of the second switch.

3. A DC-DC converter, comprising:

a transformer having a primary winding and a secondary winding having a tap intermediate its first and second end terminals;

a primary circuit connected for coupling an input DC voltage to the primary winding, including a first switch connected in series with the primary winding and the input DC voltage; and a clamping circuit including a storage capacitor and a second switch enabled to connect the capacitor to the primary winding when the first switch is non conducting;

a secondary circuit connected for connecting energy from the first and second end terminals of the secondary winding to a first and second output; including:

a first output channel connected to the first end terminal and including in a first series connection a first rectifying diode and a first inductor and the first series connection connecting the first end terminal to the first output;

a second output channel connected to the second end terminal and including in a second series connection a second rectifying diode and a second inductor and the second series connection connecting the second end terminal to the second output;

a first and second capacitor connecting the first and second outputs to a return lead which is connected to the tap of the secondary winding; and a feedback circuit including means to sense one of the first and second outputs and including means to generate an error voltage representative of a deviation of the sensed output from a desired regulated value an a pulse width modulator responsive to the error voltage and connected to drive the first and second switches such that the primary winding experiences equal volt seconds during conduction and non-conduction intervals of the first switch in order to regulate both the first and second output with energy transfer to the first output channel during conduction of the first switch and with energy transfer to the second output channel during conduction of the second switch.

4. A DC-DC converter, comprising:

a transformer having a primary winding and a first and second secondary winding galvanically isolated;

a primary circuit connected for coupling an input DC voltage to the primary winding, including a first switch connected in series with the primary winding and the input DC voltage; and a clamping circuit including a storage capacitor and a second switch enabled to connect the capacitor to the primary winding when the first switch is non conducting;

a secondary circuit connected for connecting energy from the first and second secondary windings to a first and second output, respectively; including:

a first output channel connected to the first secondary winding and including in a first series connection a first rectifying diode and a first inductor and the first series connection connecting the first secondary winding to the first output;

a second output channel connected to the second secondary winding and including in a second series connection a second rectifying diode and a second inductor and the second series connection connecting the second secondary winding to the second output;

a first and second capacitor connecting the first and second outputs to a first and second return lead, each of which is connected to the first and second secondary winding, respectively; and a feedback circuit including means to sense one of the first and second outputs and including means to generate an error voltage representative of a deviation of the sensed output from a desired regulate value and a pulse width modulator responsive to the error voltage and connected to drive the first and second switches such that the primary winding experiences equal volt seconds during conduction and non-conduction intervals of the first switch in order to regulate both the first and second output, with energy transfer to the first output channel during conduction of the first switch and with energy transfer to the second output channel during conduction of the second switch.

5. A DC to DC converter, comprising:

a power transformer having a primary winding and at least a secondary winding means as an output of the transformer;

a primary circuit connected for coupling an input DC voltage to the primary winding, including a first switch connected in series with the primary winding and the input DC voltage; and a clamping circuit including a storage capacitor and a second switch enabled to connect the capacitor to the primary winding when the first switch is non conducting;

a secondary circuit connected for connecting energy from an output of the power transformer to a first and second output; including:

a first output channel connected to the output of the power transformer and including in a first series connection a first rectifying diode and a first inductor and the first series connection connecting the output of the power transformer to the first output;

a second output channel connected to the output of the power transformer and including in a second series connection a second rectifying diode and a second inductor and the second series connection connecting the output of the power transformer to the second output;

a first and second capacitor connecting the first and second outputs to a return lead which is connected to the first and second capacitor connecting the first and second outputs to a return lead which is connected to the power transformer; and a feedback circuit including means to sense one of the first and second outputs and including means to generate an error voltage representative of a deviation of the sensed output from a desired regulated value and a pulse width modulator responsive to the error voltage and connected to drive the first and second switches such that the primary winding experiences equal volt seconds during conduction and non-conduction intervals of the power switch in order to regulate both the first and second output, with energy transfer to the first output channel during conduction of the first switch and with energy transfer to the second output channel during conduction of the second switch.

6. A DC to DC converter, as claimed in claim 5, comprising:

the secondary winding means having a winding with a first and second end terminal and a tap intermediate the first and second end terminals; and the first and second output channels being connected to the first end terminal and a return lead from the output being connected to the second end terminal.

7. A DC to DC converter, as claimed in claim 5, comprising:

the secondary winding means having a winding with first and second end terminals and a tap intermediate the first and second end terminals; and the first and second output channels being connected to the first end terminal and the tap respectively and a return lead from the output being connected to the second end terminal.

8. A DC to DC converter, as claimed in claim 5, comprising:

the secondary winding means having a winding with first and second end terminals and a tap intermediate the first and second end terminals; and the first and second output channels being connected to the first end terminal and the second end terminal, respectively and a return lead from the output being connected to the tap intermediate the first and second end terminals.

9. A DC to DC converter, as claimed in claim 5, comprising:

the secondary winding means having a first and second independent galvanically isolated secondary windings, each having first and second end terminals; and the first and second output channels being connected to the first end terminal of each of the first and second isolated secondary windings, and a return lead from each of the first and second outputs being connected to the second end terminals of the first and second secondary windings, respectively.

* * * * *

UNITED STATES PATENT AND TRADEMARK OFFICE
CERTIFICATE OF CORRECTION

PATENT NO. : 5,541,828
DATED : July 30, 1996
INVENTOR(S) : Allen F. Rozman

It is certified that error appears in the above-identified patent and that said Letters Patent is hereby corrected as shown below:

Delete Drawing Sheets 1-2 and substitute therefor the Drawing Sheets, consisting of FIGS. 1-5, as shown on the attached pages.

Signed and Sealed this

Twelfth Day of January, 1999

Attest:

Attesting Officer

*Acting Commissioner of Patents and Trademarks*